United States Patent
Rudent et al.

(10) Patent No.: US 6,354,150 B1
(45) Date of Patent: *Mar. 12, 2002

(54) SENSOR FOR A CAPILLARY TUBE OF A MASS FLOW METER

(75) Inventors: Pascal Rudent; André Boyer, both of Montpellier; Alain Giani, Le Cres; Pierre Navratil, Montpellier, all of (FR)

(73) Assignee: Societe Qualiflow SA, Montpellier Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,742

(22) Filed: Feb. 24, 1998

(30) Foreign Application Priority Data

Dec. 30, 1997 (EP) .............................. 97403185

(51) Int. Cl.[7] .............................. G01F 5/00; G01F 1/68
(52) U.S. Cl. ................. 73/202.5; 73/204.27; 73/204.26
(58) Field of Search ............................... 73/202, 202.5, 73/204.27, 204.26

(56) References Cited

U.S. PATENT DOCUMENTS

| | | | | |
|---|---|---|---|---|
| 3,056,295 A | * | 10/1962 | Laub | 73/204.27 |
| 3,938,384 A | * | 2/1976 | Blair | 73/204.27 |
| 4,559,814 A | * | 12/1985 | Sato et al. | 73/204.27 |
| 4,672,997 A | * | 6/1987 | Landis et al. | 73/202.5 |
| 5,285,673 A | * | 2/1994 | Drexel et al. | 73/204.27 |
| 5,347,861 A | * | 9/1994 | Satoh | 73/204.12 |
| 5,398,549 A | * | 3/1995 | Suzuki | 73/204.26 |
| 5,465,618 A | * | 11/1995 | Yasui et al. | 73/204.27 |
| 5,693,880 A | * | 12/1997 | Maginnis | 73/202.5 |
| 5,792,952 A | * | 8/1998 | Ritchart | 73/204.27 |

* cited by examiner

*Primary Examiner*—Harshad Patel
(74) *Attorney, Agent, or Firm*—Harrison & Egbert (57) ABSTRACT

The sensor (7) for a mass flow meter (1) including a capillary tube (6) for circulation of fluid in parallel with the principal circuit of the fluid circulation. The sensor includes heating mechanisms (20) of the capillary tube (6) and mechanisms for measuring the temperature (22, 23), upstream and downstream from this heating mechanism (20), and separate from the heating mechanism. The mechanisms for measuring the temperature (22, 23) are two resistors manufactured by deposition in an external manner on the sensor tube (6), one of them (22) upstream from the heating mechanism (20), the other (23) downstream from the heating mechanism. The manufacturing process includes stages of deposition by an electron gun, firstly of a layer of zirconia (21) of several microns, on the tube (6) made of stainless steel, then of the sensitive components (27) and the contacts (31, 32) of the measurement resistors (22, 23), made of platinum, and defined by masks of nickel.

7 Claims, 4 Drawing Sheets

SENSOR FOR A CAPILLARY TUBE OF A MASS FLOW METER

TECHNICAL FIELD

The invention presented here is in the domain of devices for the measurement of the flow rate of fluids in a channel.

The mass flow sensor is designed to be incorporated into a mass flow meter placed in a system for the management and control of the circulation of high purity gas, for example.

These mass flow meters usually consist of a capillary tube for the circulation of fluid, on which the representative measurements of the flow are carried out, and which is arranged in parallel with the main circuit of fluid circulation.

BACKGROUND ART

Numerous types of mass flow meters are already known to the professional. The principle of the flow sensors at the Wheatstone bridge and the measurement of the temperature difference has been known since 1947. They are most often based on a local heating of the passing fluid in the capillary tube, and a measurement of the variation in the resistance of the resistive components as a function of the temperature. The aforementioned measurement is representative of the flow of the gas in the tube, and thus of the flow rate. The two measurement resistors, of equal value, possess a large resistance and a large coefficient of variation with the temperature, are most often simply wound around the insulated capillary tube. These resistors, supplied with a constant current, heat up the tube but thus function also as the mechanisms for measuring the temperature. One of the disadvantages of this type of sensor is the sizable thermal mass of the wound resistors, which generates an equally long response time.

Among other known devices, the European patent application 0 131 318 B1 (Bronkhorst 1984) could be cited, which poses the problem of deriving the zero point of measurement when the fluid itself has a variable temperature, and suggests a mounting principle for the flow sensor based on four resistors sensitive to temperature deposited in a manner, not detailed, on a layer, the nature of which is not specified. The resistors are mounted in the Wheatstone bridge in a customary manner.

In another application, (EP 0 395 126 B1), Bronkhorst proposes a geometry of the tube having a very elongated U, and equipped with a series of thermocouples placed symmetrically and a central heating resistor in two parts, possibly with Peltier cooling components, for handling problems of errors in measurement associated with a circulation of air to the outside of the sensor or from internal convection to the capillary tube.

The U.S. Pat. No. 5, 373 737 (Goldstar 1993) presents a mass flow sensor which is insensitive to variations in the external temperature, using two resistors wound to the outside of the fluid circulation tube, mounted in a Wheatstone bridge, and a cooling element placed in a thermally insulated enclosed space.

Similarly, U.S. Pat. No. 5,410,912 reveals a mass flow sensor in which two resistors are used with a mounting in a bridge. The aforementioned sensor is independent from the variations in the ambient temperature due to the intermediate action of an enclosed space specific to the tube at the point of measurement. One of these resistors is used for heating and the other for measurement of the resistance as a function of the temperature reached.

There are several other patent documents involving mass flow sensors. The article "A calibration system for calorimetric mass flow devices" (Widmer, Felhmann, Rehwald, J. Phys., E: Sci. Instr Vol 15 1982 pp 213) presents the global manner of diverse technologies existing for flow meters since 1900 and the changes. One article for the presentation of the background of the recent technical evolution of mass flow meters is provided by "Recent Advances in Mass Flow Controls", pp 86, Solid State Technology, 9/94.

As it is observed, several designs for thermal fluid flow sensors have been proposed to solve problems of measurement precision if the sensor is outside the capillary tube, of corrosion if the sensor is placed inside the tube, of deriving the reference point as a function of the intrinsic temperature of the fluid, of the interference phenomenon of transfer of heat to the inside or outside of the tube, of imprecision in manufacturing or of non-reproducibility in manufacturing.

Sensors of a low-flow (10 to 20 cc/minute) have many principle faults: response time, less extensive range of measurement and precision.

The response time of the existing devices is on the order of tens of seconds at the level of the sensor (time measurement of convergence of oscillations to 67% of their equilibrium value), this time being improved (typically reduced by a factor of three) by the use of the PID electronic card (Proportional Integrator Derivation) which anticipates measurement oscillations of the sensor and predicts the value of convergence. A digital card giving values specified from modeling parameters of oscillations of the sensors allows further improvement of the time, in an artificial manner.

The problem of response time of the sensor itself, which is present for all mass flow sensors, is particularly appreciable for the flow meter having a low flow, on the order of 10 to 50 cc/minute, for which the convergence time of the sensor can reach several minutes. These sensors are thus very difficult to calibrate precisely. The problem of response time, considered to be a critical point, has been approached in particular in the patent application FR 2 530 014, with a solution made by a special arrangement made of three coils wound around the tube end to end, with a coil upstream from the heating, an intermediate coil for measurement and supplemental heating, and a downstream coil for cooling between the temperatures created by the two first coils.

It is noted that in other systems, the current can be varied in a manner in order to maintain an always constant temperature, and from that the flow can be deduced. This thus involves the problem of control and thus a more complex electronic card (see EP 0 522 496 A1, Nippodenso, 1992).

The invention presented here proposes, to remedy some of the disadvantages cited, a new sensor having a very short response time.

According to a second goal of the invention, the sensor created in this manner allows low measurements.

According to a third goal of the invention, the process for manufacturing the sensor allows a manufacturing of sensors having precisely known characteristics which are reproducible and stable over time.

SUMMARY OF THE INVENTION

The present invention is a sensor for a mass flow meter comprising a capillary tube for the circulation of fluid in parallel with the main circuit of fluid circulation and designed to be integrated into a circuit for the circulation of gaseous fluids. The present for heating the capillary tube and mechanisms for measuring the temperature upstream and downstream from the heating mechanism and separate from the heating mechanism. The mechanisms for measurement of the temperature have the form of two resistors made by the deposition on the outside of the sensor tube, one of them upstream from the heating mechanism, the other downstream from this mechanism.

The separation of functions of heating and measurement makes it possible to choose materials better suited for each of the functions of heating and measurement, and thus for considerably improving the sensor performance.

The selection of resistors deposited on the tube leads to components not varying characteristics with time, contrary to the customary systems (wound resistors), hence, an increased reliability associated with the resistors having reproducible and stable characteristics over time.

According to particular devices, possibly combined, the sensor is characterized in that:

the two measurement resistors are placed symmetrically at a predetermined distance from the heating mechanism, corresponding to the zones presenting a maximum difference in temperature, the capillary tube is made of stainless steel type 316L, the capillary tube comprises an electrically insulating layer made of zirconia deposited at a thickness of several microns, the measurement resistors are made of platinum, the resistors have connection contacts at their ends having their own resistance which is many orders of magnitude lower than that of the resistors, the heating mechanism is made in the form of a coil of wire made of an alloy of nickel and chromium in the proportions of 75% –20%.

These different arrangements correspond to a preferred embodiment of the sensor. The selection of resistors made of platinum makes it possible to obtain resistances which are extremely low and a value of resistance known with precision. Similarly, the selection of the alloy of the heating resistor makes it possible to obtain a very stable resistance over time.

The use of contacts at the ends of the resistors having their own resistance which is many orders of magnitude lower than that of the measurement resistors makes it possible, during the calculation of the variations in the resistance associated with the passage of fluid into the sensor, to consider the resistance of the contacts to be negligible.

The use of wire made of nickel chromium alloy for the heating mechanism makes it possible to have a resistance which is very slightly variable as a function of temperature, and thus a constant and known heating function.

The selection of an electrically insulating layer made by deposition at a thickness of several microns (and thus presenting a thermally negligible resistance in this layer by thin-film manufacturing), associated with the manufacturing of sensitive resistors also by deposition in thin-film manufacturing, leads to a response time of the sensor which is clearly shorter than the devices using a thick insulator (for example, an aluminum sleeve of existing devices) and wound resistors having a sizable thermal mass.

The invention is also intended for the process for manufacturing the sensor tube designed to be integrated into a mass flow meter, comprising the following steps:

calculation of the distance for positioning the resistors as a function of the equations characterizing the temperatures of the tube and the gaseous flow, deposition of the insulating layer by electron gun, by adding oxygen into the enclosed space, then deposition of resistors made of platinum, by electron gun, on the capillaries insulated by the zirconia layer, through the nickel masks, at a residual pressure lower than $10^{-6}$ torr, at a thickness of several thousand angstroms.

then the deposition of the platinum contacts, by electron gun, on the capillaries insulated by the zirconia layer, through the nickel masks, at a residual pressure lower than $10^{-6}$ torr, at a thickness of several microns.

The determination of the position of the points corresponding to a maximum temperature difference between the measurement resistors is done using the equations characterizing the temperatures of the tube, on the one hand, and of the flow, on the other hand, which the customary theoretical models do not allow with precision by a single equation. These calculations have been confirmed by numerical calculations made with simulation software.

The selection of deposition of insulating material and measurement components by electron gun makes it possible to obtain a contact of the resistors which is extremely close to the insulated tube, thus a response time of the sensor which is very short.

The previously known sensors, on the contrary, use a thick, adhered and non-deposited deposition, with questionable reliability of contact and thus questionable reproducibility of the measurement made by the sensors. It is also possible here to make a deposition layer reduced to 2.5 microns instead of tens of microns as currently known.

Finally, a reproducible procedure is created, with thus the capacity to produce exactly identical characteristics in a large series of sensors.

The selection of this technology makes it possible to also manufacture resistors on the curved surface of the sensors (cylindrical tube).

According to a preferred embodiment mode, the manufacturing process of the sensor tube is includes, at the end of processing, a step for annealing the tubes for one hour at 300° C.

The description which follows, made in view of the attached drawings in the goal of explaining and not at all limiting, makes it possible to better understand the advantages, goals and characteristics of the invention.

DETAILED DESCRIPTION OF THE PRESENT INVENTION

Figure 1:
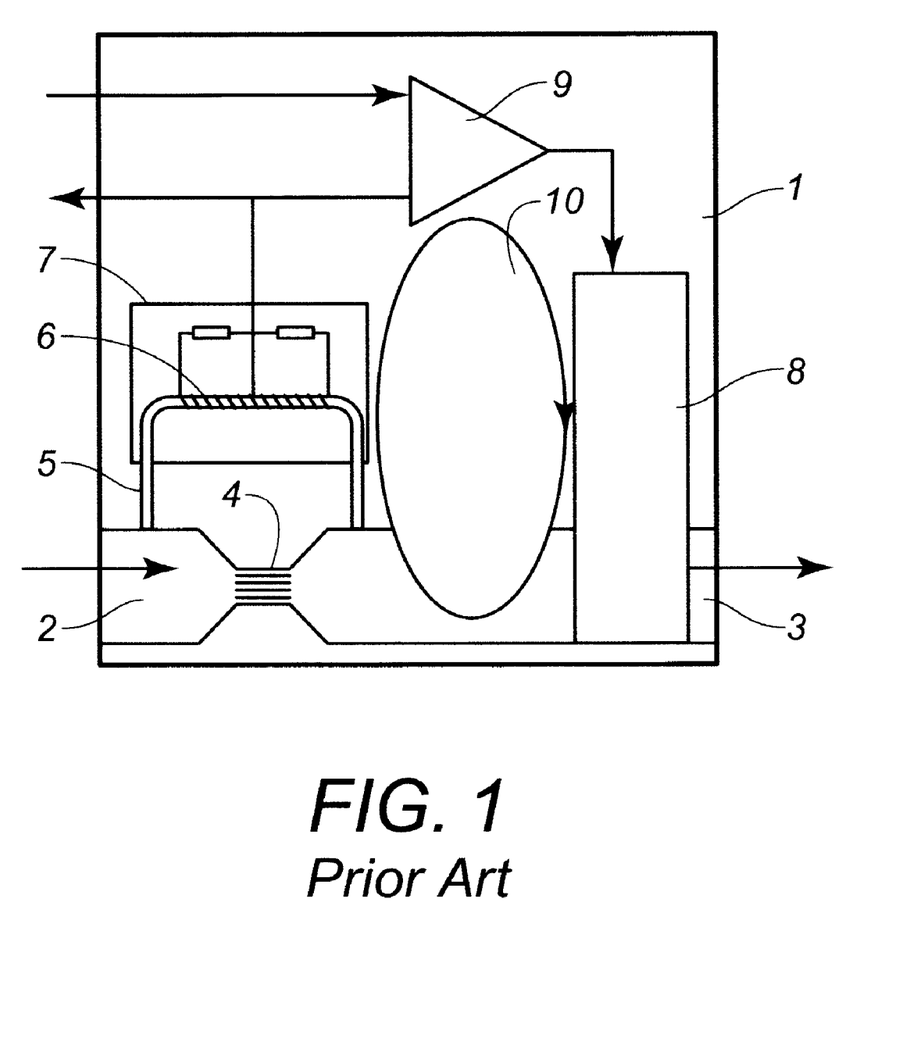
FIG. 1 shows the functional design of a prior art flow meter.

As is depicted according to the prior art arrangement in FIG. 1, a flow meter 1 is inserted into a gas circulation line, and consists of a gas input 2 and a gas output 3 (the direction of the circulation of the gas is symbolized by the arrows). The circulation of the gas has a laminar restriction 4 in the flow meter in the section of the tube, having a branch passage (bypass) 5 in parallel which circulates a part of the gas flow into a capillary tube in the sensor 7. The flow meter 1 also consists of a valve 8 for controlling the gaseous flow, which regulates the flow, and an electronic circuit 9 which is of the comparator type (P.I.D., i.e., a Proportional Integrator Differentiating Circuit) between an externally transmitted control variable and the measurement made by the sensor. A control loop 10 of the type known in the art performs the automatic functional control of the flow meter 1.

In so far as its operating principle is concerned, the sensor 7 receives and heats up a small part of the laminar flow (at full scale 10 cm³/min), which is proportional to the total flow. The mass flow rate is estimated based on the thermal transfer which it generates: the profile of the temperature without circulation of the gas along the tube 6 of the sensor 7, heated over one part of its length, is changed into an asymmetrical profile 12 when the gas circulates in the tube 6, and this temperature difference $\Delta T$ between the upstream 13 and the downstream 14 of the tube is a measurement of the mass flow (as shown in FIGS. 2A and 2B).

Figure 2A:
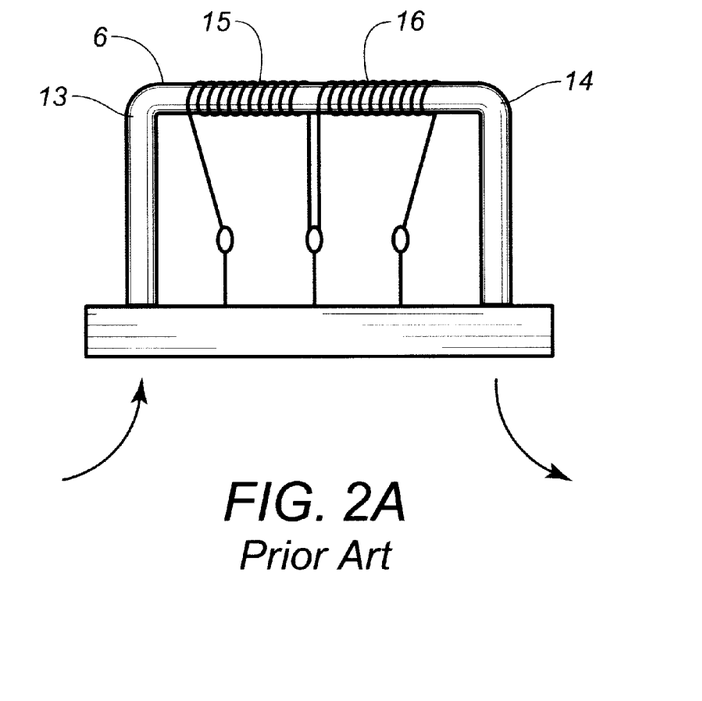
FIGS. 2A and 2B shows the functional principle of the prior art mass flow sensor.

The flow sensor, in the prior art device, consists, as viewed in FIG. 2A, of two coils 15, 16 of resistive wire, which ensure two simultaneous functions: heating and temperature measurement.

This temperature measurement is obtained by measuring the variation of the two resistances, mounted in a traditional manner in a Wheatstone bridge. The application of a constant current between the resistor connecting terminals which are selected at the equivalent value R (at the same temperature) induces heating of the capillary tube at the two adjacent locations.

Figure 2B:
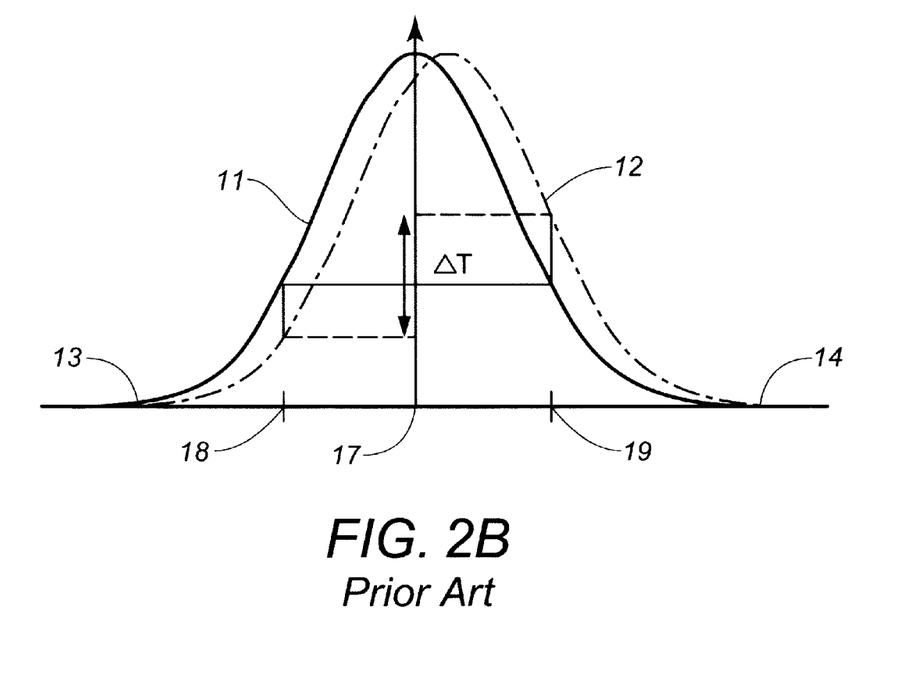

In the absence of the circulation of gas in the capillary, the temperature distribution is represented by the curve 11 in FIG. 2B (the curve shows the value of the temperature in the ordinate (y) axis, and the distance along the tube in the abscissas (x) axis) and is, of course, symmetrical with respect to the center 17 of the two resistances. On the contrary, in the case of the circulation of gas in the tube (curve 12), the temperature distribution is asymmetrical, and it is seen that between the two points 18, 19 equidistant from the center 17 of the resistances, a temperature difference $\Delta T$, results in the different measurements of the resistance for the two resistive components, R$-\delta$R and R$+\delta$R.

Figure 3A:
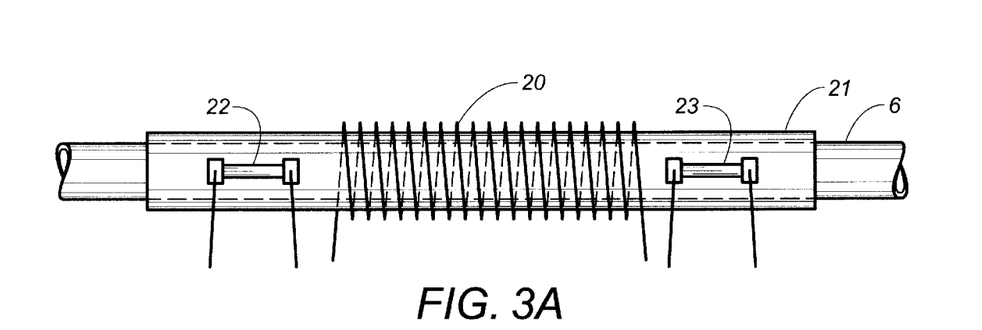
FIGS. 3(A) and 3(B) shows the sensor for the present invention seen from above and from the side, respectively.
Figure 3B:
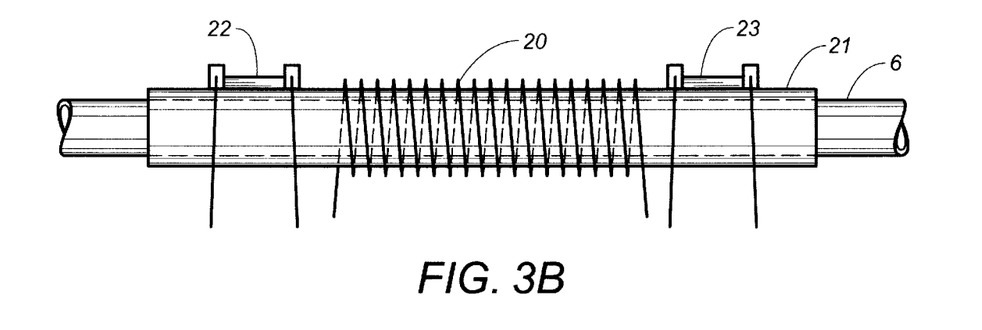

The structure of the sensor according to the invention is a sensor of the type called "six-wire", having heating and measurement functions which are separated as is seen in FIG. 3. The heating is ensured by a resistive wire 20 made of a nickel-chromium alloy, wound around the tube 6. The tube 6 has an insulating layer 21 and two temperature measuring mechanisms 22 and 23 which are resistors varying with the temperature, obtained by thin film technology. The wound heating wire 20 must have a resistance slightly varying with the temperature as opposed to the measurement resistances 22 and 23. In total there are 6 connection wires of the sensor (2 per measurement resistance and 2 for the resistive wire), thus the name.

The calculation of the position of the measurement resistances 22, 23 in comparison with the position of the resistive wire 20 makes necessary a presentation here of the analytical calculation model used, which distinguishes between the temperature of the gas circulating in the tube 6 and the temperature of the tube 6 itself.

This model distinguishes the different thermal flows, per the length of the tube, which occur in the sensor: the axial flow of thermal conduction in the tube 6, the radial flow exchanged between the gas and the tube, the radial flow exchanged between the tube and its environment, the power injected per unit of length P (in W/m).

In these calculations, it is considered that this power is injected in the thickness of the tube. The environment of the tube has a thermal resistance denoted $R_T$ per unit length (K m$^{-1}$ W$^{-1}$). The tube has a section S (m²) and a thermal conductivity k (W m$^{-1}$ K$^{-1}$)

The temperature of the gas, $\theta_g$ (K), and the temperature of the tube $\theta_p$ (K), are both the increases in temperature compared to the ambient temperature. They only depend on their position x along the tube 6, the origin of which is the center 17 of the heating coil.

For a small tube element, the sum of the different thermal flows must be zero at a constant rate of flow. This leads to the following equation:

$$kS\frac{d^2\theta_p}{dx^2} + Nu\pi\lambda(\theta_g - \theta_p) - \frac{1}{R_T}\theta_p + P = 0 \quad (1)$$

where Nu is the Nusselt constant. For a laminar flow rate in a tube heated at constant power, its mean value is 4.36. $\lambda$(W m$^{-1}$ K$^{-1}$), the thermal conductivity of the gas, and $C_p$ (J kg$^{-1}$ K$^{-1}$), the thermal capacity of the gas, are selected at a mean temperature. $F_m$ is the mass flow rate of the gas (kg s$^{-1}$) in the sensor.

On the other hand, the sum of the flow transported by the gas and the flow exchanged between the gas and the tube must also be zero:

$$C_p F_m \frac{d\theta_g}{dx} + Nu\pi\lambda(\theta_g - \theta_p) = 0 \quad (2)$$

The tube is divided into three zones. For a tube of the length 2×L, heated by a coil having the length 2×$x_r$, these three zones are: $-L<x<x_r$, the upstream zone (P=0), $-x_r<x<x_r$ the heating zone (P is equal to the Joule effect per unit length and temperature), $x_r<x<L$ the downstream zone (P=0). The second equation allows us to replace the temperature of the gas by the temperature of the tube in the first equation.

One obtains a differential equation of the third order for the temperature of the gas:

$$\frac{d^3\theta_p}{dx^3} + \frac{Nu\pi\lambda d^2\theta_g}{F_m C_p dx^2} - \\ \left(\frac{1}{kSR_T} + \frac{Nu\pi\lambda}{kS}\right)\frac{d\theta_g}{dx} - \frac{Nu\pi\lambda}{F_m C_p kSR_T}\theta_g + \frac{Nu\pi\lambda P}{F_m C_p kS} = 0 \quad (3)$$

The three roots of the equation characteristic of the temperature of the gas $\omega 1$, $\omega 2$, and $\omega 3$ can be noted. The general solution of the equation (3) is written:

$$\theta_g(x) = Ae^{\omega_1 x} + Be_{107\ 2}^{x+Ce\omega_3 x} - PR_T \quad (4)$$

where A, B and C are constants of integration.

Equation 2 gives the temperature of the tube where $$\alpha = \frac{Nu\pi\lambda}{C_p}$$

$$\theta_p(x) = A\left(1 + \frac{\omega_1}{F_m\alpha}\right)e^{\omega_1 x} + B\left(1 + \frac{\omega_2}{F_m\alpha}\right)e^{\omega_2 x} + C\left(1 + \frac{\omega_3}{F_m\alpha}\right)e^{\omega_3 x} - PR_T \quad (5)$$

In each zone, the constants A, B, C are different and determined by the boundary conditions.

At infinity, very far from the heating resistor, the temperature of the gas is the ambient temperature. This hypothesis leads to the elimination of one or two exponentials in equation 4.

The temperature of the gas, its first and second derivatives are continuous at $x=x_r$ and $x=-x_r$ (see equation 2).

Figure 4:
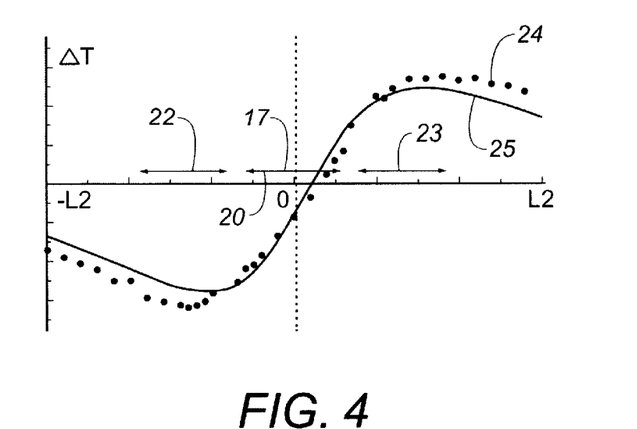
FIG. 4 shows the temperature differences created by a gas flow at full scale along the sensor.
Figure 5:
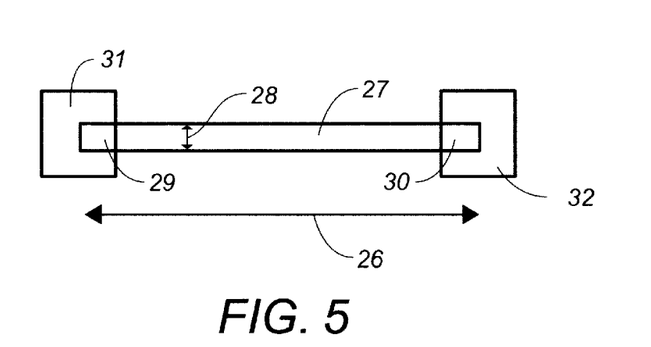
FIG. 5 shows the geometry of a sensitive resistive component of the sensor.

FIG. 4 shows the temperature differences created by the a flow rate of gas at full scale along the sensor 7. There is excellent correspondence between the values measured at the thermocouple (curve 24) and the values calculated (curve 25). FIG. 5 shows this temperature difference is due to a flow rate of nitrogen at full scale, calculated and measured at the thermocouple. The difference between the temperatures, symmetrical between the upstream and downstream of the heating coil, either calculated or measured, is linear compared to the flow rate of the gas.

All these results show the reliability of the model and make it possible to extend it to the sensor tube 6 with its insulating layer 21, on which the measurements of the temperature are difficult to perform.

The different traditional thermal analytical models of the sensor consider the temperature of the gas to be equal to the temperature of the tube.

In fact, the temperature of the gas can be very different from the temperature of the tube if the gas has a low thermal diffusion coefficient, as does nitrogen, for example. This thermal diffusion coefficient, denoted a, appears in the second equation:

$$J_v \frac{d\theta_g}{dx} + Nu \pi a(\theta_g - \theta_p) = 0 \quad (6)$$

where $J_v$ is the volumetric flow rate (m³/s).

In addition, it is necessary to note that a numerical simulation will show a radial temperature gradient in the gas which has a low thermal diffusion coefficient.

Considering the properties of the gas which are constant along the tube and selecting them at a mean temperature does not have to generate significant error. In effect, the calorific capacity of the majority of the gas does not depend on the temperature.

The variation of the density of the gas as a function of the temperature has, however, an effect if the sensor is parallel to the force of gravity.

From the calculations can be obtained:
  the length of the coil of resistive wire 20, in order to have a good sensitivity,
  the placement and the length of the temperature resistors 22 and 23. They must be near to the coil 20, where the temperature of the tube 6 is changed the most by the gas.

The resistors 22 and 23 forming these sensors must be as short as possible in order to consider the measurement of the temperature to be local but long enough so that their resistance R is increased enough.

Once the dimensions determined comply with what has just been explained, the manufacture of the sensor 7 is done in the following manner. In the embodiment presented as non-limiting (FIG. 3), the capillary tube 6 has an outside diameter of 0.9 member for approximately 60 member of length, and it is made of stainless steel of the type 316L or the equivalent. The heating resistive wire 20 used is made of an alloy of nickel (75%) and chromium (20%) which has the particularity of having an increased resistance 1.33 Ohm.mm²m⁻¹ and a low coefficient of variation of resistance as a function of the temperature (10 ppm/° C.). This absolutely must be done to ensure the heating function. Its diameter is 28 microns and it is supplied by a current of 12.5 mA.

The insulating layer 20 is made of zirconia ($ZrO_2$), selected for its good stability and its good dielectric properties, deposited by electron gun on the capillary tube 21 of the sensor, at a thickness of 2.5 microns. It covers 20 mm over the 60 mm length of the tube 6.

On this layer, two resistors of platinum 22 and 23 are deposited (by deposition of the platinum through the nickel masks) which make up the resistances for measurement of the temperature of the tube. The platinum, a stable material, non-oxidizable, obtained having a very large purity, has a large temperature coefficient (CTR: 3.9 10— 3° C.-1). This is why it is often used for the manufacture of calibrating resistors. These two resistors 22 and 23, placed symmetrically compared to the center 17 of the coil of resistor wire 20, are mounted in a Wheatstone bridge. The length of the coil of heating resistive wire is approximately 6 mm, and the distance between the two measurement resistances 22 and 23 is thus approximately 7 mm. They are arranged symmetrically here and there before and after the center 17 of the coil.

The difference between the temperatures, i.e. between the two measurement resistors 22 and 23 is thus proportional to the rate of flow and its measurement thus corresponds to a measurement of the flow rate circulating in the capillary 6.

The geometry of each measurement resistor 22 and 23 made of platinum is detailed in FIG. 5. In this representation, the length 26 of the sensitive component 27 of each measurement resistor is approximately 4.5 mm, and the width 28 is 100 microns. The sensitive component 27 has its solid ends 29 and 30 of the two contacts 31 and 32 connecting to the measurement wires (not shown), in the form of rectangular sectional sheets also made of platinum, 400 microns wide by 50 microns long. The contacts 31 and 32 have a width which is larger than the sensitive components 27, so that their resistance may be considered to be negligible during measurement.

As concerns the manufacturing itself, the insulating layer ($ZrO_2$) 21, the sensitive components 27 of the resistors 22 and 23 made of platinum, the contacts 31 and 32 made of platinum, are made in this order by thin film deposition using an electron gun.

The substrate, the sensor tube 6 made of stainless steel 316L, is held on a heating support. In order to obtain two roughly equivalent resistors, it is preferable that the substrate support be in rotation during deposition.

The deposition of the zirconia is done by the addition of oxygen into the enclosed space in order to ensure the deposit of an oxidized insulating layer 21. The parameters for the deposit by electron gun, of the zirconia on the capillary tubes 6, are thus the following:
  target: $ZrO_2$
  thickness deposited: 2 to 3 microns
  residual pressure: lower than $10^{-6}$ Torr
  O2 pressure: $8 \cdot 10^{-5}$ Torr
  substrate temperature: 300° C.
  speed of deposition: 20 to 40 angstroms per second.

As concerns the deposition of the sensitive components 27 and the contacts 31 and 32, the sensitive components made of platinum are deposited, also by electron gun, on the capillaries 6 insulated by the layer of zirconia 21, through the nickel masks. Two deposits and two masks are necessary, due to the geometry desired for the measurement resistances 22 and 23: one for the sensitive components 27 made of platinum, and the other for the contacts 31 and 32. They are obtained from the same target of platinum. The two deposits are made at a residual pressure lower than $10^{-6}$ torr. The thickness of the measurement resistances 22 and 23 can vary according to the requirements from 2000 to 7000 angstroms. This is to be determined according to the desired value of the resistance, R.

The parameters for the deposit of the resistors are the following:
- distance of target-capillaries: 10 cm
- thickness of the resistances: 2000 to 7000 angstroms
- substrate temperature: 200° C.
- speed of deposition: 13 to 20 angstroms per second.

The parameters for the deposit of the contacts are the following:
- distance of target-capillaries: 8 cm
- thickness of the resistances: 1 to 2 microns
- substrate temperature: 200° C.
- speed of deposition: 20 to 30 angstroms per second.

Once the deposits are done, the capillaries 6 are annealed for one hour at 300° C. in order to fix the coefficient of variation of the resistances 22 and 23 with the temperature (according to a traditionally-used effect), the layer then reforms in a stable manner. This thus makes it possible to obtain a sensor 7 likely to function at high temperature. It is understood that in this manner a resistance is thus made which is more reliable than a coiled resistance whose coefficient varies with time in the course of the aging of the protective varnish and of the wire.

The functional mode of the device is identical to the traditional functioning, having a measurement in the Wheatstone bridge of the difference between the resistances upstream 22 and downstream 23 in the direction of the circulation of the fluid. The coil of the heating resistive wire 20 is separately supplied power, in a controlled manner, by the electronic card 9.

By the technology of the deposition used, a close contact is obtained here between the resistances 22 and 23 and the tube 6, contact which ensures a larger rapidity of the sensor 7, having as the most favorable consequence a considerably reduced response time.

Figure 6:
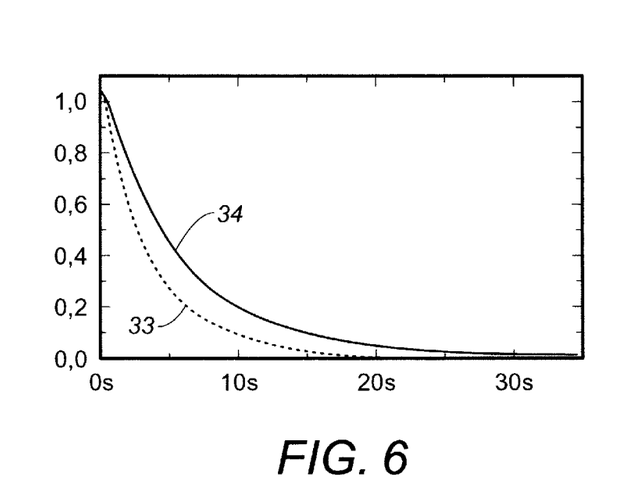
FIG. 6 shows the response time compared to a traditional sensor and of a sensor according to the invention.

The improvement of the response time of the sensor using the invention is measured, for example, on a traditional flow meter, having a reduction of time of convergence to 67% of the sensor from 6 seconds to 3.5 seconds in equivalent conditions, which makes up a very appreciable improvement, on the order of 40%. FIG. 6 shows the gain in time of the response made by this new type of sensor (curve 33) compared with a traditional sensor (curve 34).

Another advantage of this sensor is in presenting reliable measurement resistors 22 and 23 (the reliability being connected in particular to the use of platinum), in the sense that they are reproducible and stable over time, without the aging phenomenon, which makes a great advantage compared to the previous technology.

It is understood that it is possible in using the invention presented here to make at one time a large series of parts having exactly identical characteristics (for example, several groups of ten), which makes possible, at the same time, savings in manufacturing and an excellent reproducibility of the measurement results obtained.

It is noted that the two measurement resistances 22 and 23 deposited in the aforementioned zones on the tube 6 are sufficient in the invention, in the measurement where the temperature of the tube is uniform since the heating is done uniformly around the tube, there is thus no longer the need for resistances placed at several places on the tube, or covering a large surface.

Another advantage of the invention presented here lies in the possible functioning of the device at a high temperature, associated with the annealing done at 300° C. after processing, which gives the sensor a large degree of gradient stability below the annealing temperature.

In a variation of the deposition process, cathodic pulverization is used and also provides easily reproducible results.

In another variation relative to the material of the insulating layer, yttric zirconia can be used to replace the pure zirconia.

It is apparent in addition that if the embodiment example shows capillary tubes of 0.9 mm external diameter (0.7 mm inside), other diameters are possible according to the range of flow rates imagined for the flow meter, with the same principle of processing.

The manufacturing process, as has been explained, can be used in order to make sensors of the mass flow meter in which the heating and measuring functions are combined. It is thus necessary to carry out a deposit around all of the tube, in such a way as to obtain a uniform heating function of the tube.

Finally, up until now, only deposition for measurement resistors has been mentioned. It is of course possible to replace the heating resistance 20, made as the coil in the embodiment mode described as an example, by a deposited heating resistor.

The range of the invention presented here is not limited to the embodiment methods presented but, on the contrary, extends to improvements and modifications which are conceivable to the professional.

We claim:

1. A sensor apparatus comprising:
   a mass flow meter having a main circuit suitable for fluid circulation therein;
   a capillary tube arranged in parallel to said main circuit, said capillary tube having an insulating layer deposited thereon;
   a heating means affixed to said capillary tube for heating a fluid passing therethrough;
   a first temperature measurement resistor affixed by a first deposit axial to said capillary tube onto an exterior surface of said capillary tube upstream from and separate from said heating means; and
   a second temperature measurement resistor affixed by a second deposit axial to said capillary tube onto said exterior surface of said capillary tube downstream of and separate from said heating means, each of said first and second deposits having a rectangular shape with a length dimension and a width dimension, said length dimension positioned so as to be parallel to a direction of the fluid flow passing through said capillary tube, each of said first and second deposits not being of a coil form.

2. The sensor apparatus of claim 1, wherein said first and second temperature measurement resistors are affixed symmetrically at a predetermined distance from said heating means, said resistors being positioned on said capillary tube corresponding to zones having a maximum temperature difference of the fluid passing through said capillary tube.

3. The sensor apparatus of claim 1, wherein said capillary tube is of a type 316L stainless steel material.

4. The sensor apparatus of claim 1, wherein said insulating layer is formed of a zirconia material.

5. The sensor apparatus of claim 1, wherein each of said first and second temperature measurement resistors have connection contacts at respective ends thereof, each of said first and second temperature measurement resistors has a sensitive component extending between said connection contacts, each of said connection contacts has a resistance which is lower than a resistance of said sensitive component, said connection contacts are made of platinum and have a width larger than a width of said sensitive component.

6. The sensor apparatus of claim 1, wherein said heating means comprises a coil of wire formed of an alloy of nickel and chromium in a proportion of 75% and 20% respectively.

7. The sensor apparatus of claim 1, wherein said capillary tube has a circular cross section with an outer diameter of between 0.4 mm and 2.0 mm.

\* \* \* \* \*